United States Patent
Gieras

(10) Patent No.: US 10,770,936 B2
(45) Date of Patent: Sep. 8, 2020

(54) MODULAR PERMANENT MAGNET ROTOR

(71) Applicant: Hamilton Sundstrand Corporation, Charlotte, NC (US)

(72) Inventor: Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 267 days.

(21) Appl. No.: 15/673,472

(22) Filed: Aug. 10, 2017

(65) Prior Publication Data
US 2019/0052136 A1 Feb. 14, 2019

(51) Int. Cl.
| H02K 1/27 | (2006.01) |
| H02K 1/02 | (2006.01) |
| H02K 1/28 | (2006.01) |
| H02K 7/18 | (2006.01) |
| H02K 15/03 | (2006.01) |
| H02K 21/16 | (2006.01) |

(52) U.S. Cl.
CPC .............. *H02K 1/27* (2013.01); *H02K 1/02* (2013.01); *H02K 1/278* (2013.01); *H02K 1/28* (2013.01); *H02K 7/1807* (2013.01); *H02K 15/03* (2013.01); *H02K 21/16* (2013.01); *H02K 2201/06* (2013.01); *H02K 2213/12* (2013.01)

(58) Field of Classification Search
CPC ........ H02K 1/27; H02K 1/272; H02K 1/2726; H02K 1/274; H02K 1/2753; H02K 1/278; H02K 1/28
USPC ............ 310/156.01, 156.28, 156.29, 156.36, 310/156.37, 156.31
See application file for complete search history.

(56) References Cited

U.S. PATENT DOCUMENTS

| 3,990,802 A * | 11/1976 | Corona ..................... H02K 1/28 403/24 |
| 4,127,786 A | 11/1978 | Volkrodt |
| 4,469,970 A | 9/1984 | Neumann |
| 5,739,615 A * | 4/1998 | McClelland ............. H02K 1/24 310/186 |
| 5,881,448 A | 3/1999 | Molnar |
| 6,655,004 B2 * | 12/2003 | Stuart ....................... B22F 7/06 29/596 |
| 6,836,954 B1 * | 1/2005 | Carli ...................... H02K 1/278 29/596 |

(Continued)

FOREIGN PATENT DOCUMENTS

| CN | 202142920 | 2/2012 |
| EP | 2099114 | 9/2009 |
| WO | 2016059004 | 4/2016 |

OTHER PUBLICATIONS

European Search report for Application No. 18188285.3 dated Sep. 20, 2018.

*Primary Examiner* — Nguyen Tran
(74) *Attorney, Agent, or Firm* — Carlson, Gaskey & Olds, P.C.

(57) ABSTRACT

A rotor includes a shaft. A plurality of rotor modules are disposed about the shaft. Each of the rotor modules includes a cylindrical support ring, a ferromagnetic core radially outward of the support ring, at least one PM arc arranged in a first ring and at least one PM arc arranged in a second ring, the first and second ring being radially outward of the ferromagnetic core, and a retainer having a first wall disposed radially outward of the first ring and the second ring and a second wall defining an axial boundary between the first ring and the second ring.

22 Claims, 2 Drawing Sheets

(56) References Cited

U.S. PATENT DOCUMENTS

| | | | |
|---|---|---|---|
| 7,057,323 B2 | 6/2006 | Horst | |
| 8,063,530 B2 | 11/2011 | Podack | |
| 8,415,843 B2* | 4/2013 | Li | H02K 1/278 |
| | | | 310/407 |
| 9,231,459 B2 | 1/2016 | Flynn | |
| 2009/0180686 A1* | 7/2009 | Schwartz | H04N 1/6086 |
| | | | 382/167 |
| 2009/0224619 A1 | 9/2009 | Okubo | |
| 2010/0156205 A1* | 6/2010 | Davis | H02K 11/048 |
| | | | 310/46 |
| 2013/0221789 A1 | 8/2013 | Atkinson et al. | |
| 2015/0380999 A1* | 12/2015 | Joshi | H02K 1/28 |
| | | | 310/156.28 |
| 2016/0172914 A1* | 6/2016 | Li | F04D 13/06 |
| 2017/0040853 A1 | 2/2017 | Totaro et al. | |
| 2017/0149296 A1* | 5/2017 | Vikman | H02K 1/28 |
| 2017/0279323 A1* | 9/2017 | Kinoto | H02K 1/22 |
| 2019/0006916 A1* | 1/2019 | Peterson | H02K 21/16 |

* cited by examiner

MODULAR PERMANENT MAGNET ROTOR

TECHNICAL FIELD

The present disclosure relates generally to electrical motors, and more specifically to a modular configuration of a permanent magnet rotor for an electrical motor.

BACKGROUND

Aircraft, such as passenger jets and the like, typically include a complicated electrical power system capable of generating electrical power and distributing the electrical power throughout the aircraft using a power distribution system. The electrical power provides operational power to multiple onboard electrical systems. Included among the onboard electrical systems are electrical motors that convert the provided electrical power to rotational energy.

One type of electric motor used on some aircraft for some applications is a permanent magnet (PM) motor, such as a PM brushless machine. PM brushless machines provide a high power density and a high efficiency when converting the electrical energy into rotational motion. However, PM brushless machines have high costs associated with design time and PM materials when designed and constructed for a single specific utilization.

SUMMARY OF THE INVENTION

In one exemplary embodiment a rotor includes a shaft, a plurality of rotor modules disposed about the shaft, each of the rotor modules including a cylindrical support ring, a ferromagnetic core radially outward of the support ring, at least one PM arc arranged in a first ring and at least one PM arc arranged in a second ring, the first and second ring being radially outward of the ferromagnetic core, and a retainer having a first wall disposed radially outward of the first ring and the second ring and a second wall defining an axial boundary between the first ring and the second ring.

In another example of the above described rotor each of the rotor modules is approximately identical.

In another example of any of the above described rotors each of the rotor modules is rotated relative to each axially adjacent motor module by an offset angle.

In another example of any of the above described rotors the offset angle is in the range of 1°-3°.

In another example of any of the above described rotors each of the at least one PM arc arranged in the first ring and at least one PM arc arranged in the second ring is offset from each circumferentially adjacent PM arc by an air gap.

In another example of any of the above described rotors each of the air gaps has an arc length of at least 1 mm.

In another example of any of the above described rotors each of the rotor modules includes a first disk shaped cover on a first axial end of the rotor module and a second disk shaped cover on a second axial end of the module opposite the first axial end.

In another example of any of the above described rotors each of the retainer, the first disk shaped cover and the second disk shaped cover are non-ferromagnetic.

Another example of any of the above described rotors further includes a first mounting feature disposed on the shaft axially adjacent the plurality of rotor modules and a second mounting feature disposed on the shaft adjacent the plurality of rotor modules and axially opposite the first mounting feature.

In another example of any of the above described rotors the first mounting feature is removable.

Another example of any of the above described rotors further includes a single can disposed about the rotor modules.

In another example of any of the above described rotors the rotor is further configured to operate as a generator in at least one mode of operations.

In another example of any of the above described rotors the plurality of PM arcs in each rotor module in the plurality of rotor modules is magnetically aligned with the plurality of PM arcs in each other rotor module in the plurality of rotor modules.

In one exemplary embodiment a permanent magnet (PM) rotor module includes a cylindrical support ring, a ferromagnetic core radially outward of the support ring, at least one PM arc arranged in a first ring and at least one PM arc arranged in a second ring, the first and second ring being radially outward of the ferromagnetic core, and a retainer having a first wall disposed radially outward of the first ring and the second ring and a second wall defining an axial boundary between the first ring and the second ring.

In another example of the above described PM rotor module the at least one PM arc arranged in the first ring comprises a plurality of PM arcs, the first ring further comprising a plurality of air gaps, and the at least one PM arc arranged in the second ring comprises a plurality of PM arcs, the second ring further comprising a plurality of air gaps.

In another example of any of the above described PM rotor modules the at least one PM arc arranged in the first ring comprises a single PM arc of three hundred and sixty degrees, and the at least one PM arc arranged in the second ring comprises a single PM arc of three hundred and sixty degrees.

In another example of any of the above described PM rotor modules the second wall extends radially inward from the first wall.

In another example of any of the above described PM rotor modules the cylindrical support ring includes an alignment notch intruding radially outward from a radially inner surface of the cylindrical support ring.

In another example of any of the above described PM rotor modules each PM arc of the at least one PM arc arranged in the first ring and at least one PM arc arranged in the second ring is radially polarized.

In another example of any of the above described PM rotor modules each PM arc of the at least one PM arc arranged in the first ring and at least one PM arc arranged in the second ring has a polarity aligned with an axially adjacent PM arc of the at least one PM arc arranged in the first ring and at least one PM arc arranged in the second ring and the polarity is opposite a polarity of each circumferentially adjacent PM arc of the at least one PM arc arranged in the first ring and at least one PM arc arranged in the second ring.

Another example of any of the above described PM rotor modules further includes a first disk shaped cover on a first axial end and a second disk shaped cover on a second axial end opposite the first axial end, each of the first and second disk shaped covers interfacing with the retainer.

In another example of any of the above described PM rotor modules the first wall of the retainer defines a radially outward housing portion of the rotor module.

These and other features of the present invention can be best understood from the following specification and drawings, the following of which is a brief description.

DETAILED DESCRIPTION OF AN EMBODIMENT

Figure 1:
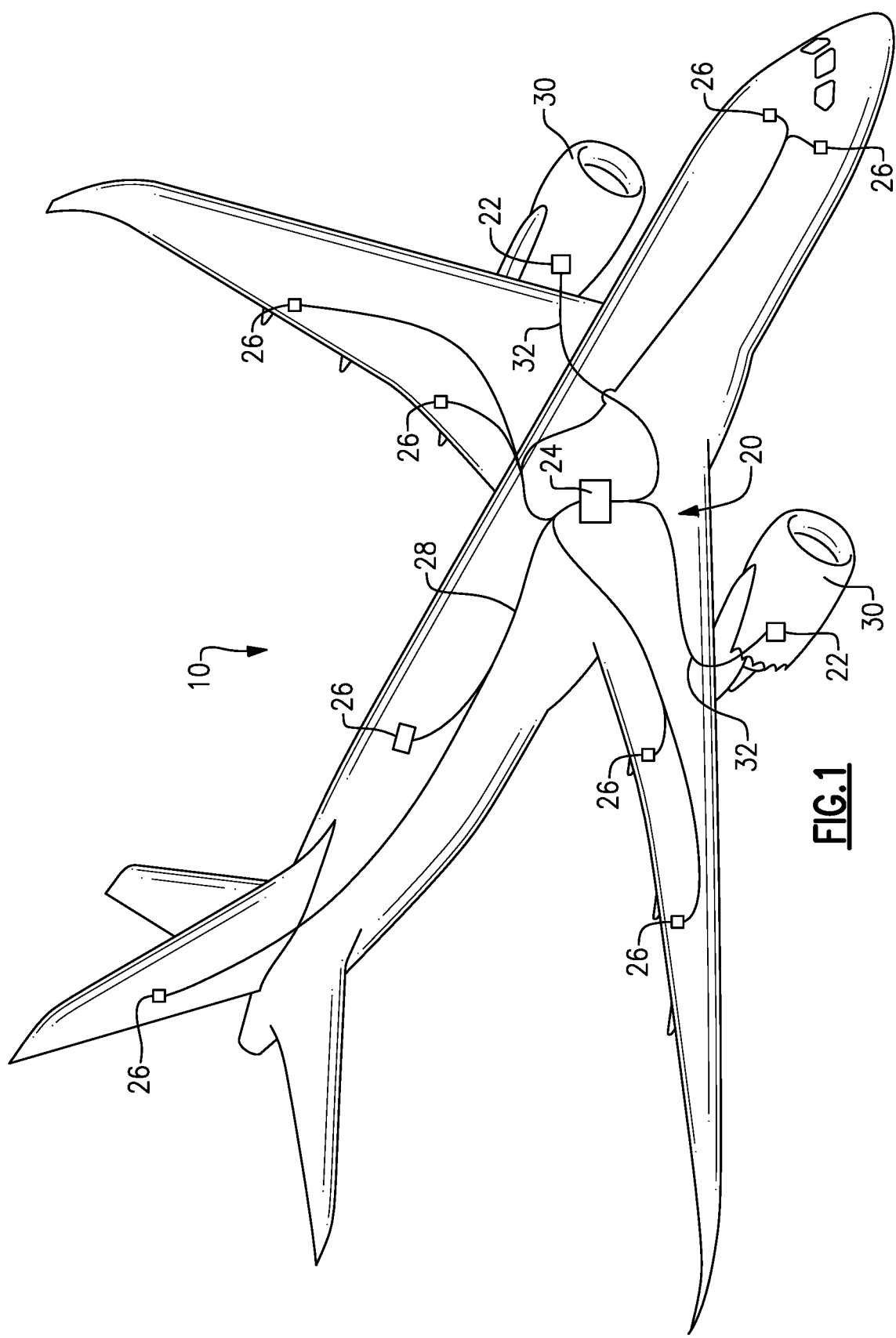
FIG. 1 illustrates a high level schematic view of an exemplary aircraft electrical system.

FIG. 1 schematically illustrates an exemplary aircraft 10 including a power generation and distribution system 20. The power generation and distribution system 20 includes generators 22 connected mechanically to turbine engines 30. The generators 22 convert rotational motion from the turbine engines 30 into electrical power, and provide the electrical power to a power distributor 24 via electrical connections 32. The power distributor 24 distributes the electrical power to multiple onboard electrical systems 26 via power distribution lines 28. The power distributor 24 can distribute AC power, DC power, or any combination thereof according to known power distribution principles. The onboard electrical systems 26 can include sensors, AC to DC converters, controllers, environmental control systems, cabin lighting, rotational machines such as PM rotors, induction motors and any other electrically powered element onboard the aircraft 10.

As each application of the rotational machines requires unique power outputs, and has unique space constraints, design time for each machine, as well as the high cost of PM materials for the machines, can significantly increase the cost of utilizing rotational machines. To reduce the costs associated with design time, and allow for unified parts, a rotational machine design incorporating modular PM rotors can be used. The modular rotors in one example are tailored to aircraft applications and reduce the cost of manufacturing rotational machines by increasing the ease of manufacture and unifying the parts across multiple implementations of the rotational machines.

Figure 2:
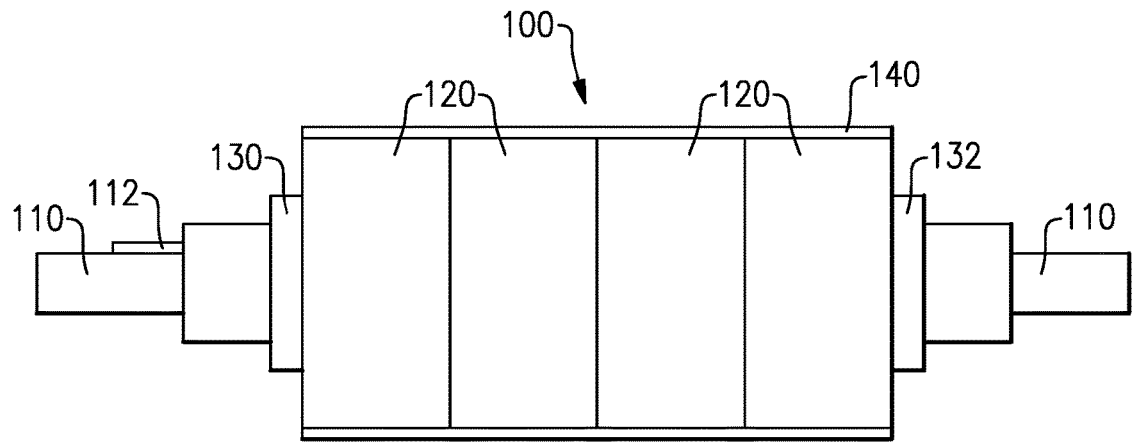
FIG. 2 schematically illustrates an exemplary modular rotor for an electric machine for utilization in an aircraft.

FIG. 2 schematically illustrates a modular rotor 100 for a rotational machine, according to one example. The modular rotor 100 for the the rotational machine includes an output shaft 110 about which multiple PM rotor modules 120 are disposed. A first mounting feature 130 is included on the shaft 110 axially adjacent the rotor modules 120 at a first axial end of the rotor modules 120. A second mounting feature 132 is included on the shaft 110 at a second axial end of the rotor modules 120, with the second axial end being axially opposite the first axial end of the rotor modules 120. The first and second mounting features 130, 132 maintain the rotor modules 120 in an axial position on the shaft 110. In some examples, such as the illustrated example, an additional can 140, or rotor module housing, can be included radially outward of the rotor modules 120. The can 140 further aids in maintaining the rotor modules 120 in position during operation of the rotor 100 for the rotational machine. In alternative examples, the can 140 can be omitted and an outer housing element of the rotor module 120 can provide a similar function.

In some examples, one or both of the mounting features 130, 132 are fixed to the shaft 110 resulting in a permanent rotor construction. In alternative examples, one or both of the mounting features 130, 132 can be removable from the shaft 110, resulting in reconfigurable and/or replaceable rotor modules 120. The alternative example allows for the repair and reconfiguration of the rotor 100 for the rotational machine. By way of example, a removable mounting feature 130, 132 could be a threaded nut, or any similar construction.

In some examples, the shaft 110 can include a keying feature 112. The keying feature is a shaft feature that interfaces with an internal support ring structure of each rotor module 120, and aligns the rotor modules 120 with each other rotor module 120. In some examples, the keying feature 112 can further allow for, or require, a slight angular offset of each rotor module 120 from each adjacent rotor module 120. The angular offset operates to reduce, or eliminate, a flux clogging effect that can increase as more rotor modules 120 are added to the rotor 100 for the rotational machine. In some examples, the rotational offset is in the range of one to three degrees. Further, the rotational offset can be either sequential in a single rotational direction or in alternating rotational directions.

In the exemplary rotor 100 for the rotational machine, each of the rotor modules 120 is a PM rotor, and all of the rotor modules 120 are substantially identical. As used herein, substantially identical refers to rotor modules 120 configured to the same design specifications, including tolerance ranges of various specifications such as dimension, magnetic field strength, and the like. By utilizing substantially identical rotor modules 120, design time is decreased as the only design constraints that must be considered are the axial length of the rotor 100 for the rotational machine and the number of rotor modules 120 required to achieve a desired output torque based on the input voltage that will be received. Each of the rotor modules 120 interacts with a generated electrical field to drive rotation of the shaft 110 according to known PM rotor configurations.

Figure 3A:
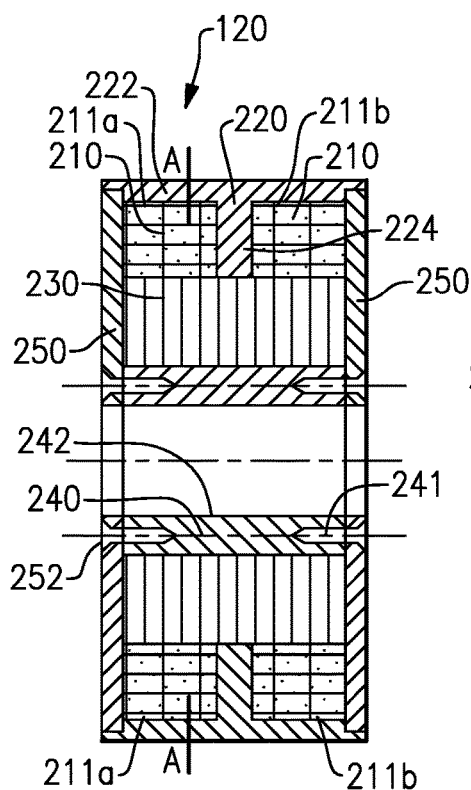
FIG. 3A illustrates an axial cross sectional view of a single PM rotor module for a modular electrical motor.
Figure 3B:
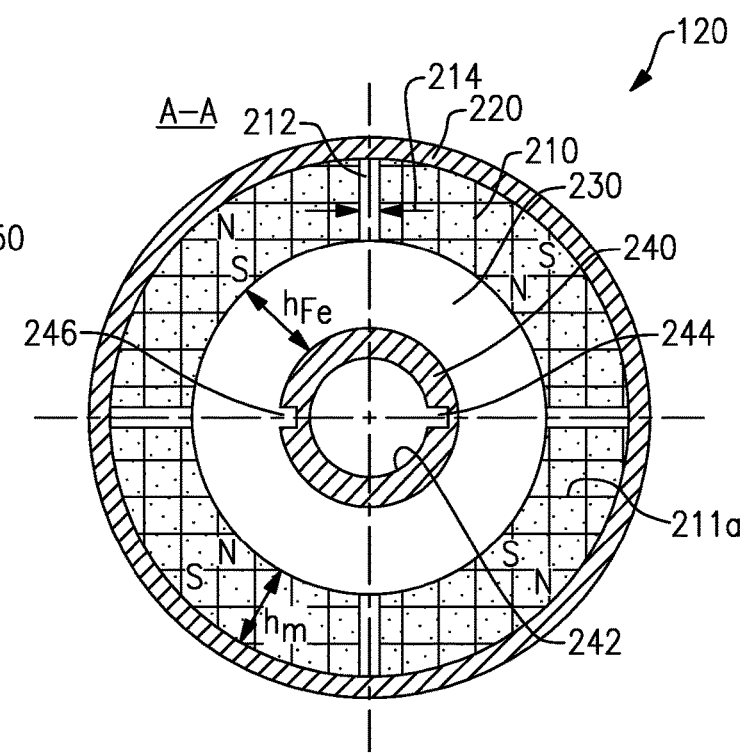
FIG. 3B schematically illustrates a radial cross section of the PM rotor module of FIG. 3A, along view line A-A.

With continued reference to FIG. 2, FIGS. 3A and 3B schematically illustrate a single rotor module 120 from an axially aligned cross sectional view (FIG. 3A) and a radially aligned cross sectional view (FIG. 3B).

Each rotor module 120 is a radial flux PM brushless rotor including multiple PM arcs 210 retained in a non-ferromagnetic retainer 220. In the illustrated example, each of the PM arcs 210 have an arc of less than 360 degrees. In some alternative examples, the PM arc can be a full 360 degrees, resulting in a ring shape. The PM arcs 210 define two PM rings 211a, 211b within the rotor module 120. The non-ferromagnetic retainer 220 has a T-shaped radial cross section with an axially aligned wall 222 being disposed radially outward of the PM arcs 210, and a radially aligned wall 224 protruding radially inward between two axially adjacent PM arcs 210. The two PM rings each include an even number of PM arcs 210 with an air gap 212 being defined between each PM arc 210 and each circumferentially adjacent PM arc 210. In some examples, the air gap has an arc length 214 of at least 1 mm in length in order to prevent flux leakage between circumferentially adjacent PM arcs 210.

Each of the PM arcs 210 is magnetized radially, with one of the north and south pole of the PM arc 210 at a radially outward edge of the PM arc 210, and the other of the north and south pole being at the radially inward edge of the PM arc 210. Further, each PM arc 210 has poles aligned opposite of the poles of each circumferentially adjacent PM arc 210. Further, each of the two PM rings, defined by the PM arcs 210, are aligned with each other, such that axially adjacent PM arcs 210 have matching pole alignments. The matching pole alignments further extend to adjacent rotor modules 120, as described above. Each of the PM arcs 210 has a constant radial height $h_m$. The required constant radial height $h_m$ is dependent on the magnetic flux density of the air gap between the stator and rotor and the required torque output of the rotor module 120, and can be determined by one of skill in the art using conventional means.

The illustrated rotor modules 120 are four-pole modules and include four PM arcs 210 in each of the PM arc rings. Alternatively, any even number of poles can be conceived, subject to space constraints, with a corresponding number of PM arcs 210 and air gaps 212 in each PM arc ring, and the rotor module 120 configuration is not limited to the illustrated four pole configuration. In yet further examples, the required speed of, and the application of, a PM brushless motor can be determinative of the number of PM poles that are required.

Radially inward of the PM arcs 210 is a ferromagnetic core 230. The ferromagnetic core 230 is, in some examples, constructed of ferromagnetic laminations or soft magnetic composites (SMC). In alternative examples, the ferromagnetic core 230 can be constructed of any other suitable core material or construction. The ferromagnetic core 230 is constructed with a radial thickness $h_{Fe}$ that is generally constant, with the exception of a portion protruding into a support ring notch 246 for alignment. The radial thickness depends on the diameter of the rotor module 120, number of poles and the rated power of the PM material utilized to construct the PM arcs 210. By way of example, for a two pole machine, which would have the greatest radial thickness, the radial thickness is at least 10 mm.

Radially inward of the ferromagnetic core 230 is a cylindrical support ring 240. The cylindrical support ring 240 defines a radially inner surface 242 of the rotor module 120 and can be either ferromagnetic or non-ferromagnetic. The radially inner surface 242 contacts the shaft 110 (illustrated in FIG. 2), and can include one or more notches 244 for interfacing with the keying feature 112 (illustrated in FIG. 2) of the shaft 110. The cylindrical support ring 240, in some examples, further includes a second notch 246 that allows the cylindrical support ring 240 to interface with the ferromagnetic core 230.

Included on the axial ends of the rotor modules 120 are multiple disk shaped covers 250. The disk shaped covers 250 fully encapsulate the ferromagnetic core 230 and the rings defined by the PM arcs 210. Each of the disk shaped covers 250 can be connected to the cylindrical support ring 240 via one or more fastener holes 252 that extend through the disk shaped cover 250 and into a corresponding fastener hole 241 in the cylindrical support ring 240. By way of example, disk shaped covers 250 can be secured to each axial end of the rotor module 120 via a screw or bolt extending through the fastener hole 252 into the cylindrical support ring 240. In alternative examples, any other method or style of fastener can be utilized to the same effect. While described and illustrated herein as being utilized in an aircraft, the rotor modules 120 and modular rotor 100 for the rotational machine are not limited to aircraft applications and can be adapted for use in any other PM rotational machine application.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor comprising:
   a shaft;
   a plurality of rotor modules disposed about said shaft, each of said rotor modules comprising:
      a cylindrical support ring;
      a ferromagnetic core radially outward of the support ring;
      a first permanent magnet (PM) ring including a first at least one PM arc and a second PM ring including a second at least one PM arc, the first PM ring and the second PM ring being radially outward of the ferromagnetic core; and
      a retainer having a first wall disposed radially outward of the first PM ring and the second PM ring and a second wall defining an axial boundary between the first PM ring and the second PM ring.

2. The rotor of claim 1, wherein each of the rotor modules is approximately identical.

3. The rotor of claim 1, wherein each of the rotor modules is rotated relative to each axially adjacent motor module by an offset angle.

4. The rotor of claim 3, wherein the offset angle is in the range of 1°-3°.

5. The rotor of claim 1, wherein each PM arc of said first at least one PM arc is offset from each circumferentially adjacent PM arc in the first at least one PM arc by an air gap and each PM arc of said second at least one PM arc is offset from each circumferentially adjacent PM arc in the second at least one PM arc said second PM arc by an air gap.

6. The rotor of claim 5, wherein each of said air gaps has an arc length of at least 1 mm.

7. The rotor of claim 1, wherein each of the rotor modules includes a first disk shaped cover on a first axial end of the rotor module and a second disk shaped cover on a second axial end of the module opposite the first axial end.

8. The rotor of claim 7, wherein each of the retainer, the first disk shaped cover and the second disk shaped cover are non-ferromagnetic.

9. The rotor of claim 1, further comprising a first mounting feature disposed on said shaft axially adjacent said plurality of rotor modules and a second mounting feature disposed on said shaft adjacent said plurality of rotor modules and axially opposite the first mounting feature.

10. The rotor of claim 9, wherein the first mounting feature is removable.

11. The rotor of claim 1, further comprising a single can disposed about said rotor modules.

12. The rotor of claim 1, wherein the rotor is further configured to operate as a generator in at least one mode of operations.

13. The rotor of claim 1, wherein the plurality of PM arcs in each rotor module in said plurality of rotor modules is magnetically aligned with the plurality of PM arcs in each other rotor module in the plurality of rotor modules.

14. A permanent magnet (PM) rotor module comprising:
   a cylindrical support ring;
   a ferromagnetic core radially outward of the support ring;
   a first permanent magnet (PM) ring including a first at least one PM arc and a second PM ring including a second at least one PM arc, the first PM ring and the second PM ring being radially outward of the ferromagnetic core; and
   a retainer having a first wall disposed radially outward of the first ring and the second ring and a second wall defining an axial boundary between the first ring and the second ring.

15. The PM rotor module of claim 14, wherein the first at least one PM arc comprises a plurality of PM arcs, the first PM ring further comprising a first plurality of air gaps, and the second at least one PM arc comprises a plurality of PM arcs, the second PM ring further comprising a second plurality of air gaps.

16. The PM rotor module of claim 14, wherein the first at least one PM arc consists of a single PM arc of three hundred and sixty degrees, and the second at least one PM arc arranged consists of a single PM arc of three hundred and sixty degrees.

17. The PM rotor module of claim 14, wherein the second wall extends radially inward from the first wall.

18. The PM rotor module of claim 14, wherein the cylindrical support ring includes an alignment notch intruding radially outward from a radially inner surface of the cylindrical support ring.

19. The PM rotor module of claim 14, wherein each PM arc of said first at least one PM arc is radially polarized and said second at least one PM arc arranged in the second ring is radially polarized.

20. The PM rotor module of claim 19, wherein each PM arc of said first at least one PM arc and each PM arc of said second at least one PM arc has a polarity aligned with an axially adjacent PM arc of said first at least one PM arc and said second at least one PM arc and the polarity is opposite a polarity of each circumferentially adjacent PM arc of said first at least one PM arc and said second at least one PM arc.

21. The PM rotor module of claim 14, further comprising a first disk shaped cover on a first axial end and a second disk shaped cover on a second axial end opposite the first axial end, each of the first and second disk shaped covers interfacing with the retainer.

22. The PM rotor module of claim 14, wherein the first wall of the retainer defines a radially outward housing portion of the rotor module.

\* \* \* \* \*